(12) United States Patent
Kim

(10) Patent No.: US 7,852,803 B2
(45) Date of Patent: Dec. 14, 2010

(54) ENHANCED RADIO LINK CONTROL ERROR HANDLING

(75) Inventor: Myeong-Cheol Kim, Aachen (DE)

(73) Assignee: LG Electronics Inc., Seoul (KR)

( * ) Notice: Subject to any disclaimer, the term of this patent is extended or adjusted under 35 U.S.C. 154(b) by 497 days.

(21) Appl. No.: 11/576,594

(22) PCT Filed: Feb. 3, 2006

(86) PCT No.: PCT/KR2006/000398

§ 371 (c)(1),
(2), (4) Date: Apr. 3, 2007

(87) PCT Pub. No.: WO2006/083131

PCT Pub. Date: Aug. 10, 2006

(65) Prior Publication Data

US 2008/0064390 A1    Mar. 13, 2008

Related U.S. Application Data

(60) Provisional application No. 60/650,999, filed on Feb. 7, 2005.

(30) Foreign Application Priority Data

Nov. 8, 2005    (EP)    ................... 05292360

(51) Int. Cl.
*H04W 72/00*    (2009.01)
(52) U.S. Cl. ...................... 370/328; 455/450
(58) Field of Classification Search .................. 370/328
See application file for complete search history.

(56) References Cited

U.S. PATENT DOCUMENTS 6,625,165 B1    9/2003    Krishnamoorthy et al.
6,775,542 B1 *  8/2004    Vilander et al. ............. 455/423
6,862,450 B2 *  3/2005    Mikola et al. ............... 455/438
6,961,570 B2 * 11/2005    Kuo et al. .................... 455/436
6,987,981 B2 *  1/2006    Kuo ........................... 455/502
7,027,811 B2 *  4/2006    Pedlar ........................ 455/425

(Continued)

FOREIGN PATENT DOCUMENTS

EP    1408658 A2    4/2004

(Continued)

OTHER PUBLICATIONS

3GPP; TSG RAN: "Radio Resource Control (RRC); Protocol Specification (Release 6)" 3GPP TS25.331 Version 6.4.0, Dec. 23, 2004, pp. 1, 29, 42-359, 374-707, XP002384905.

(Continued)

*Primary Examiner*—Lester Kincaid
*Assistant Examiner*—Steven Kelley
(74) *Attorney, Agent, or Firm*—Lee, Hong, Degerman, Kang & Waimey

(57) ABSTRACT

A method of performing a cell update procedure is achieved by detecting an error associated with a radio link established with a base station; informing the base station about at least one radio bearer, at least one radio link control entity, or both having the detected error; and re-configuring the at least one radio bearer, re-establishing the at least one radio link control entity, or both based upon the informing step.

10 Claims, 10 Drawing Sheets

U.S. PATENT DOCUMENTS

| | | | |
|---|---|---|---|
| 7,068,636 B2 * | 6/2006 | Kuo | 370/338 |
| 7,155,261 B2 * | 12/2006 | Chen | 455/574 |
| 7,167,475 B2 * | 1/2007 | Tourunen et al. | 370/394 |
| 7,209,747 B2 * | 4/2007 | Chen | 455/450 |
| 7,227,856 B2 * | 6/2007 | Wu | 370/346 |
| 7,286,563 B2 | 10/2007 | Chang et al. | |
| 7,356,146 B2 * | 4/2008 | Yi et al. | 380/262 |
| 7,389,108 B2 * | 6/2008 | Pedlar et al. | 455/432.1 |
| 7,466,708 B2 * | 12/2008 | Hans et al. | 370/394 |
| 7,583,969 B2 * | 9/2009 | Mella et al. | 455/450 |
| 7,599,384 B2 * | 10/2009 | Vialen et al. | 370/437 |
| 2003/0210714 A1 | 11/2003 | Wu | |
| 2004/0203623 A1 | 10/2004 | Wu | |
| 2005/0033948 A1 * | 2/2005 | Wei | 713/1 |
| 2005/0047357 A1 * | 3/2005 | Benveniste | 370/311 |

FOREIGN PATENT DOCUMENTS

| TW | 567692 | 12/2003 |
| TW | 591920 | 6/2004 |

OTHER PUBLICATIONS

3GPP; TSG RAN: "Radio Link Control (RLC) protocol specification (Release 6)" 3GPP TS25.322 Version 6.2.0, Dec. 23, 2004, pp. 1, 24-79, XP002384906.

* cited by examiner

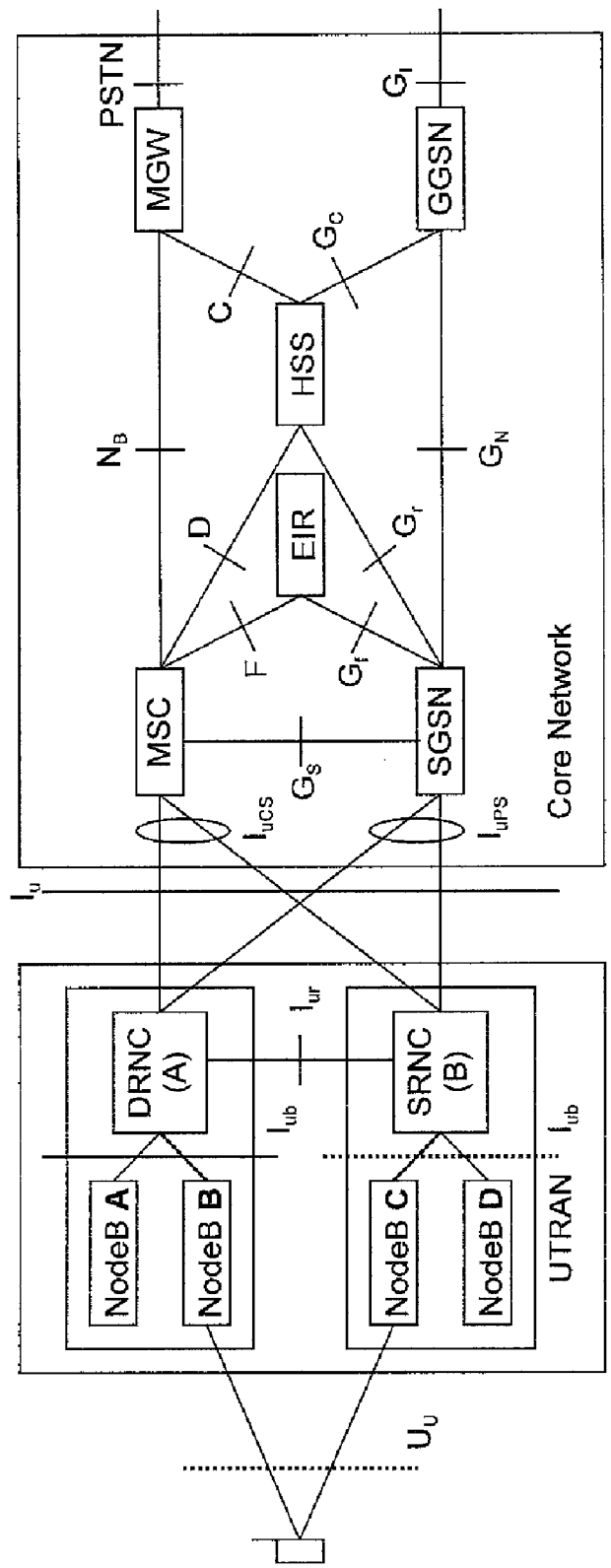
[Fig. 1]

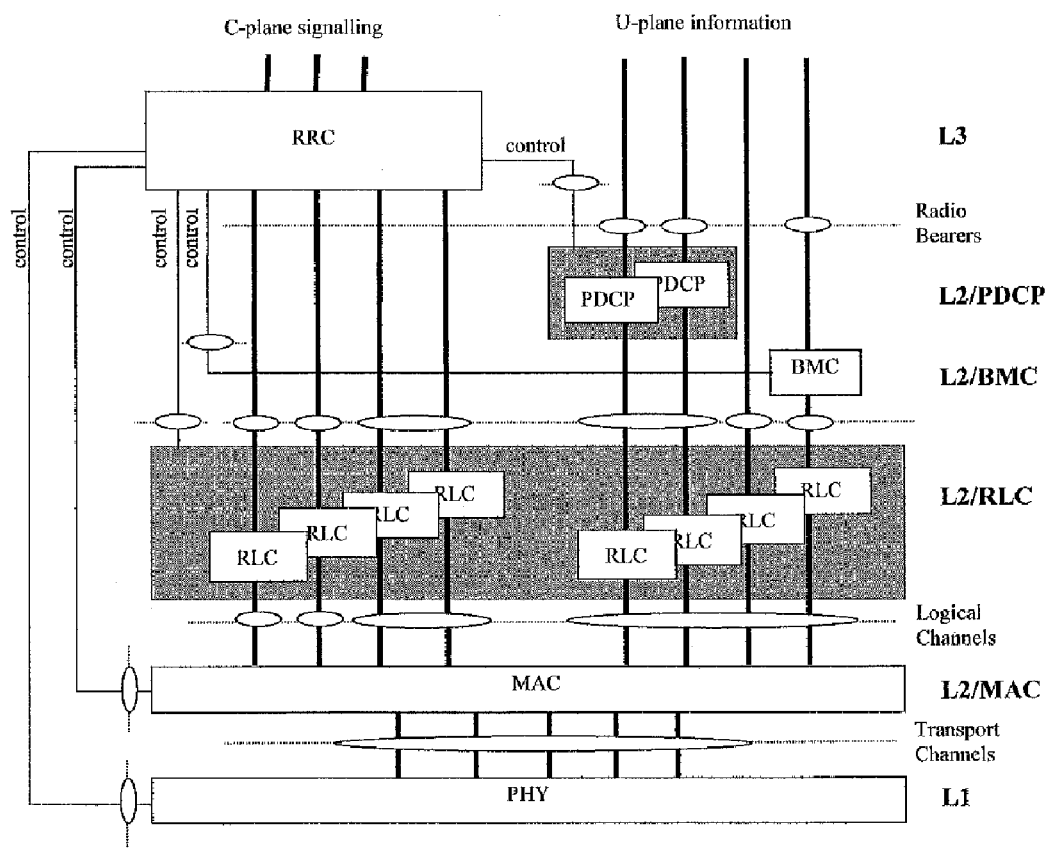
[Fig. 2]

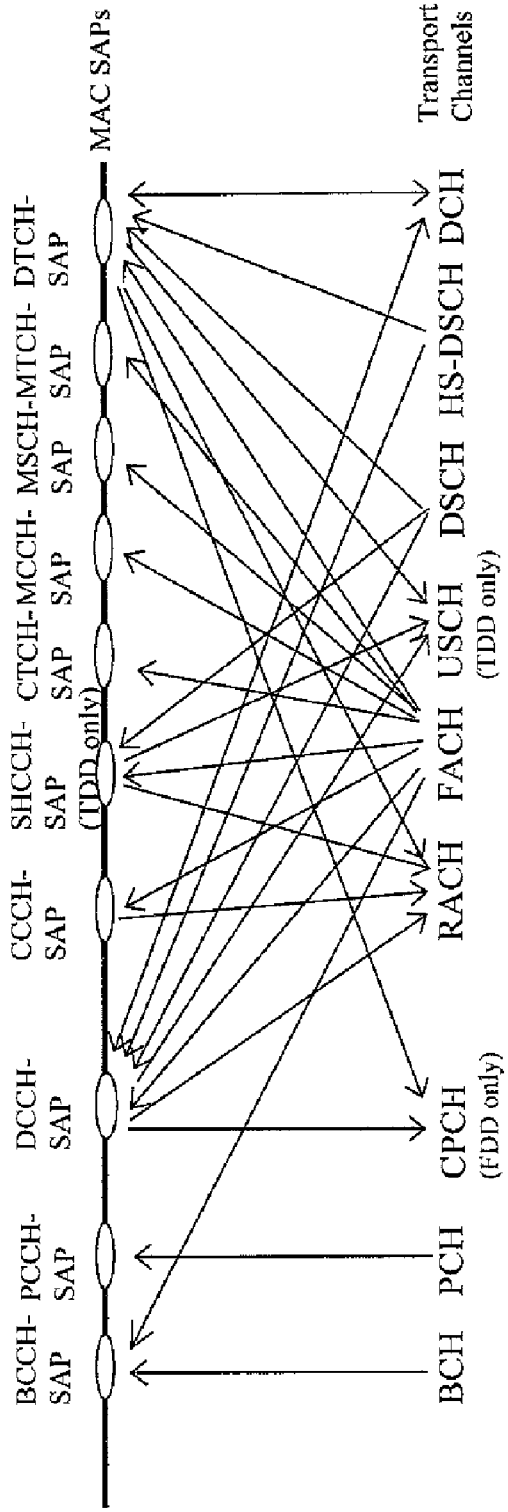
[Fig. 3]

[Fig. 4]
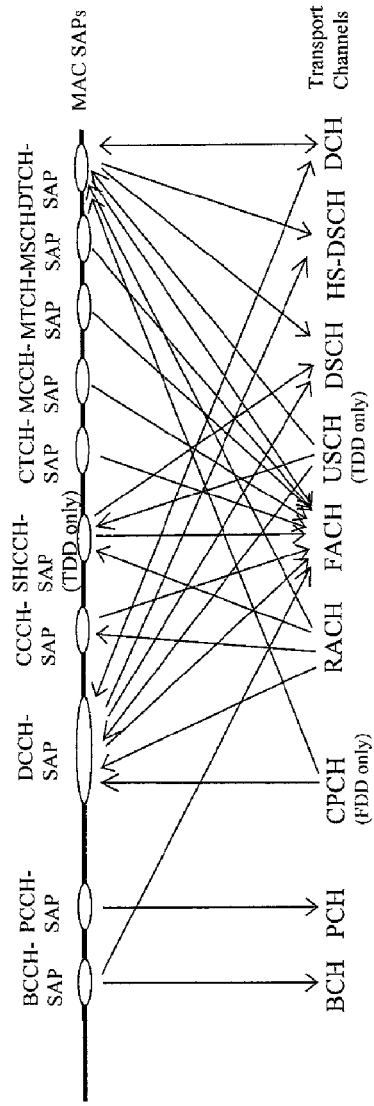
[Fig. 5]
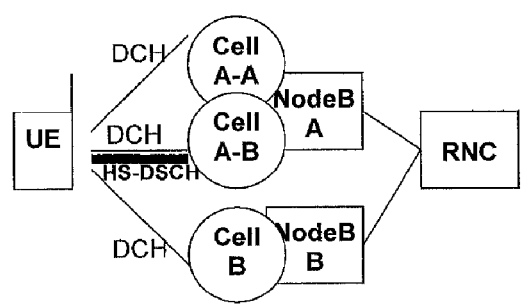

[Fig. 6]
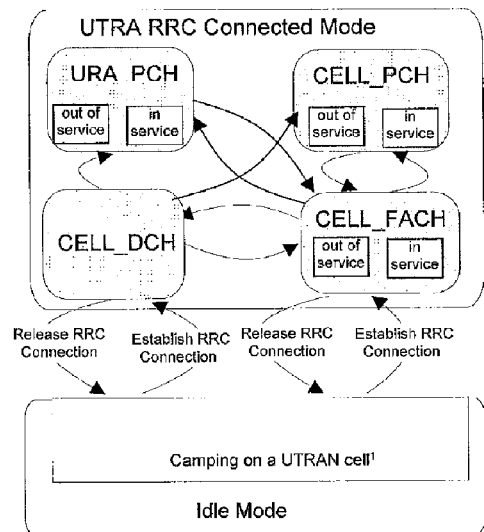
[Fig. 7]
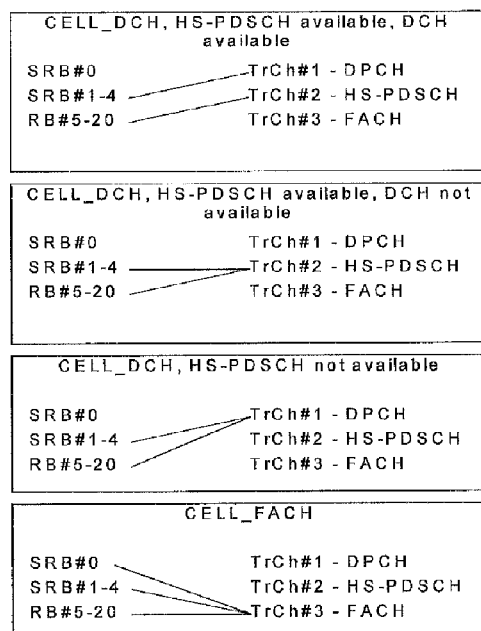
[Fig. 8]
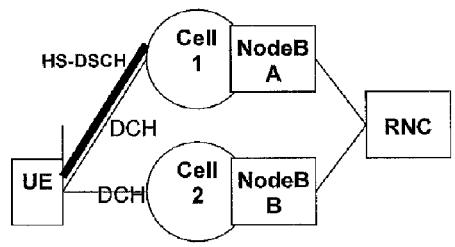

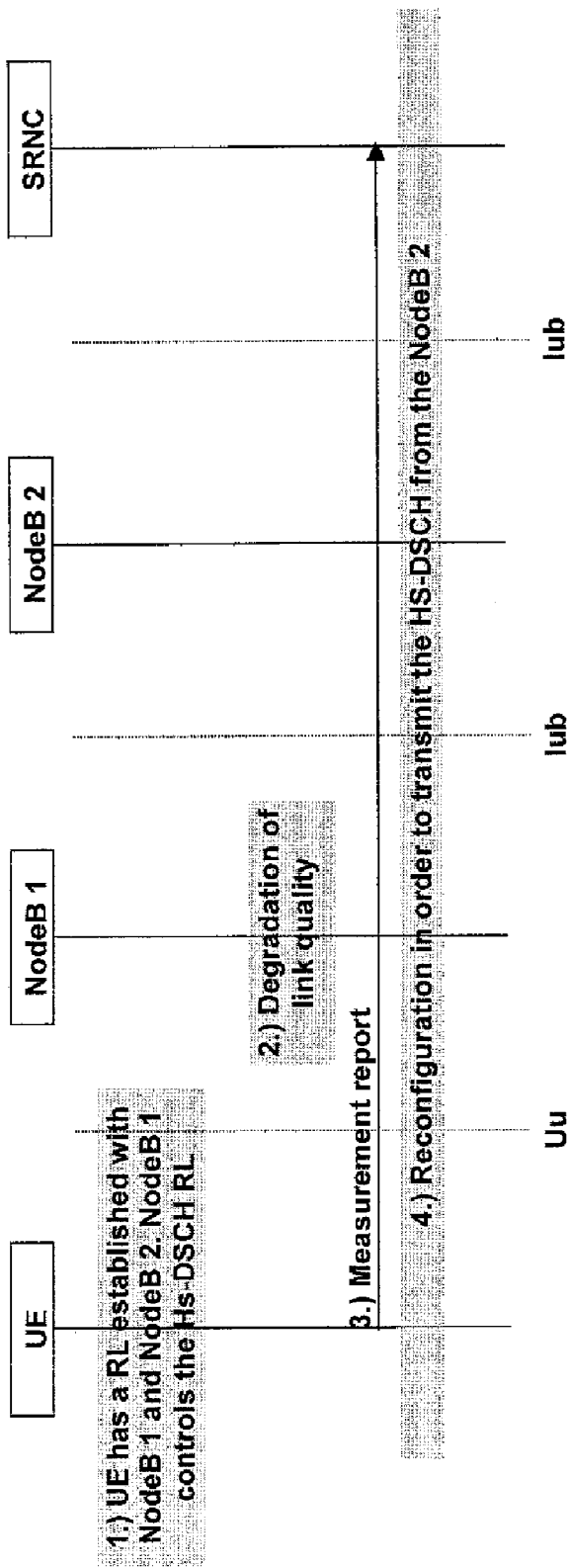
[Fig. 9]

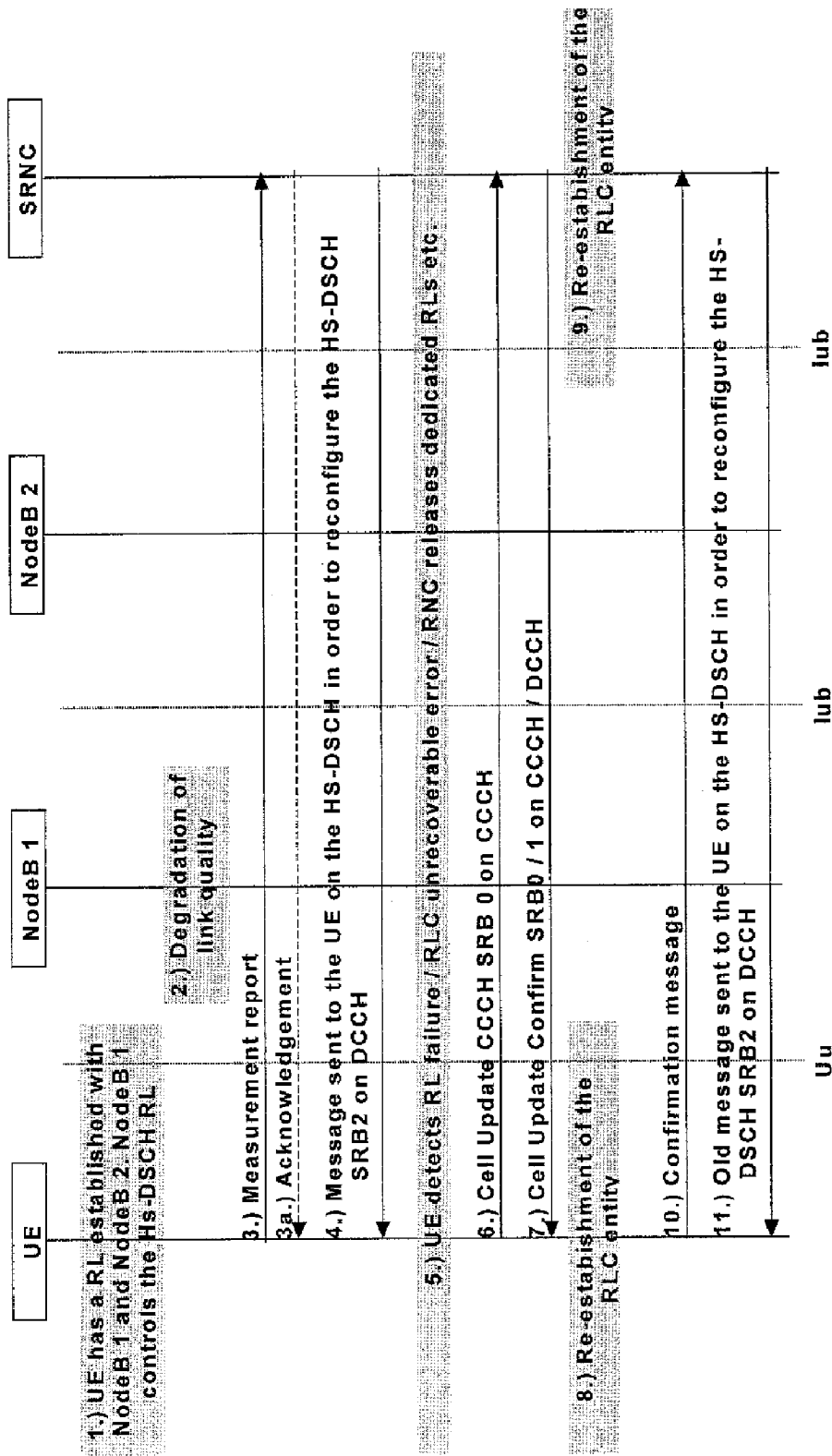
[Fig. 10]

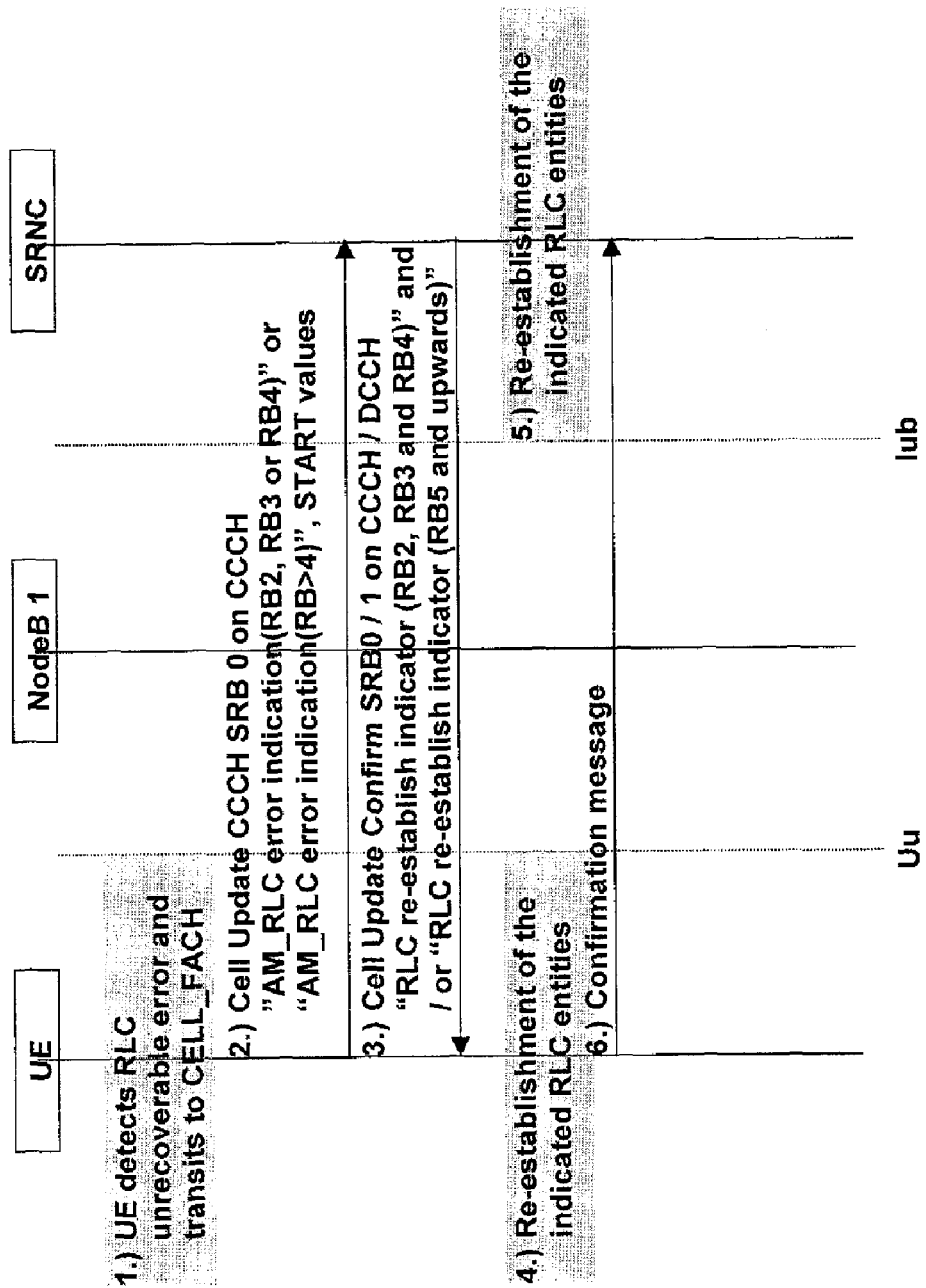
[Fig. 11]

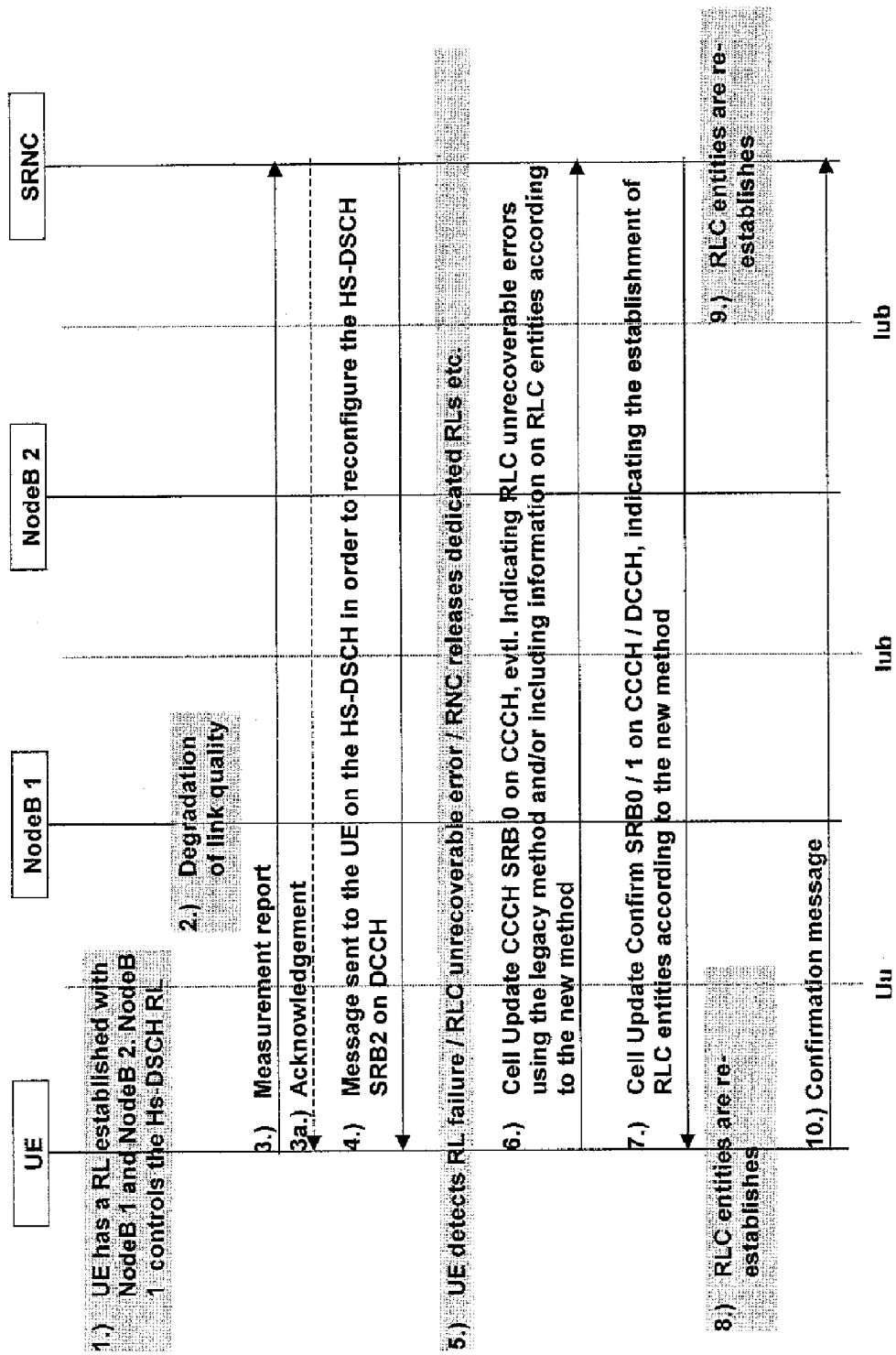
[Fig. 12]

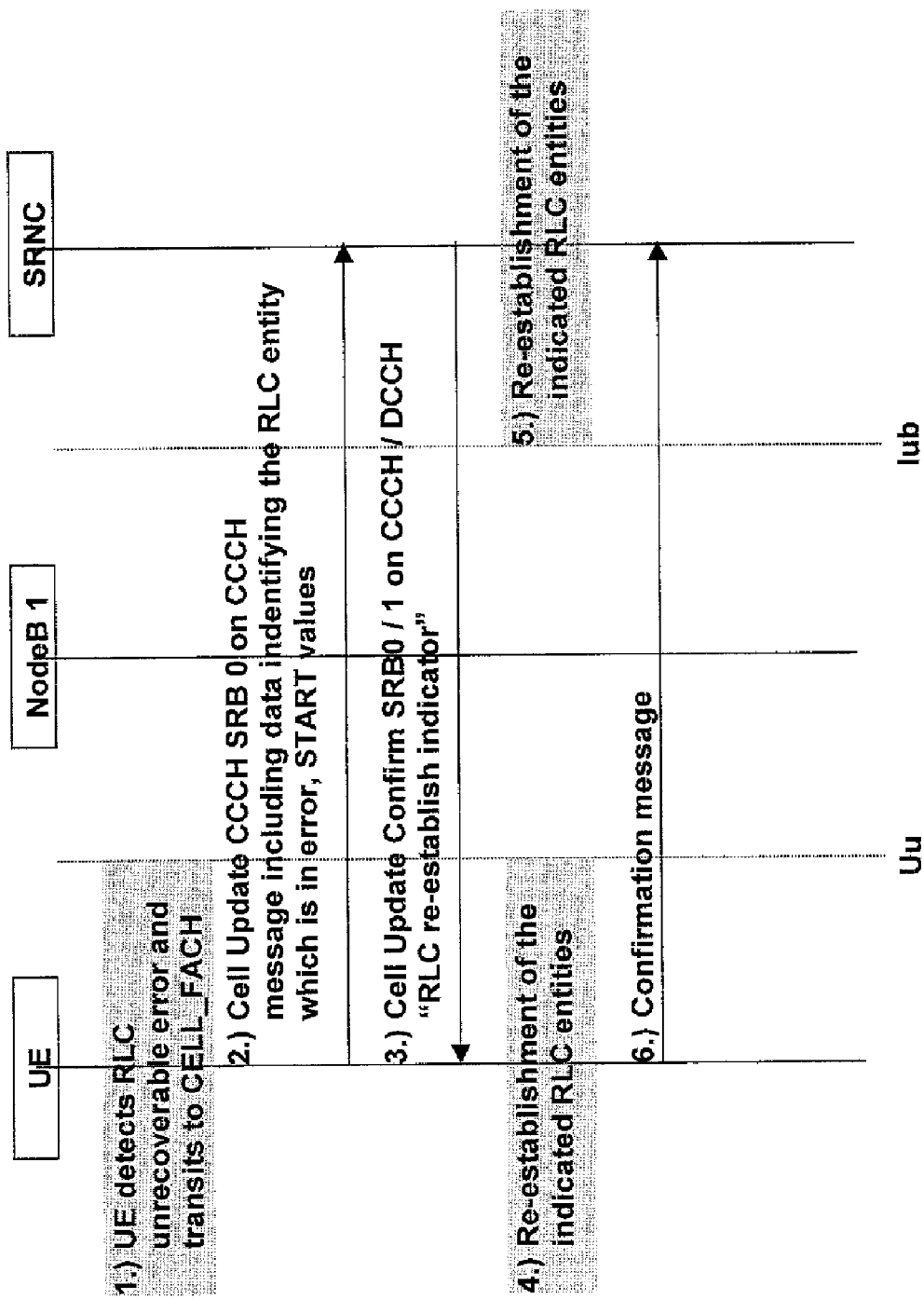
[Fig. 13]

US 7,852,803 B2

ENHANCED RADIO LINK CONTROL ERROR HANDLING

CROSS-REFERENCES TO RELATED APPLICATIONS

The present application is a national stage application of International Application Number PCT/KR2006/000398 filed Feb. 3, 2006, which claims the benefit of European Patent Application Number 05292360.4 filed Nov. 8, 2005, and claims the benefit of Provisional Application No. 60/650, 999 filed Feb. 7, 2005. All these applications are incorporated herein in their entirety.

TECHNICAL FIELD

The invention relates to a method for settling a dysfunction in a radio link established between a user equipment and a cellular network. The invention applies in particular to UMTS type networks.

BACKGROUND ART

A universal mobile telecommunication system (UMTS) is a European-type, third generation IMT-2000 mobile communication system that has evolved from a European standard known as Global System for Mobile communications (GSM).

UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology. In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 gives an overview of a UMTS network, including a user equipment (UE), such as a mobile station, a UMTS terrestrial radio access network (UTRAN) and a core network (CN).

The UTRAN is composed of several Radio Network Controllers (RNCs) and NodeBs which are connected via an Iub interface. Each RNC controls several NodeBs. Each NodeB controls one or several cells, where a cell is characterised by the fact that it covers a given geographical area on a given frequency. Each RNC is connected via an Iu interface to the CN, i.e. towards a Mobile-services Switching Centre entity (MSC) of the CN and a Serving GPRS Support Node entity (SGSN). RNCs can be connected to other RNCs via the Iur interface. The RNC handles the assignment and management of radio resources and operates as an access point with respect to the CN.

The NodeBs receive information sent by the physical layer of the UE through an uplink and transmit data to the UE through a downlink. The Node-Bs operate as access points of the UTRAN for the UE. The GPRS support node (SGSN) is connected via a Gf interface to an Equipment Identity Register (EIR), via a GS interface to the MSC, via a GN interface to the Gateway GPRS Support Node (GGSN) and via the GR interface to the Home Subscriber Server (HSS). The EIR hosts lists of mobiles which are allowed or are not allowed to be used on the network. The MSC which controls the connection for Circuit Switched (CS) services is connected via an NB interface towards the Media Gateway (MGW), via a F interface towards the EIR, and via a D interface towards the Home Subscriber Server (HSS). The MGW is connected via a C interface towards the HSS, and to the Public Switched Telephone Network (PSTN), and allows to adapt the codecs between the PSTN and the connected Radio Access Network (RAN).

The GGSN is connected via a GC interface to the HSS, and via a GI interface to the Internet. The GGSN is responsible for routing, charging and separation of data flows into different Radio Access Bearers (RABs). The HSS handles the subscription data of the users.

Other connections exist that are not important for the current invention.

The UTRAN constructs and maintains a radio access bearer (RAB) for communication between the UE and the CN. The CN requests end-to-end quality of service (QoS) requirements from the RAB, and the RAB supports the QoS requirements the core network has set. Accordingly, by constructing and maintaining the RAB, the UTRAN can satisfy the end-to-end QoS requirements.

The services provided to a specific UE are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs are connected to the mobile switching center (MSC) of the core network (CN) and the MSC is connected to the Gateway Mobile Switching Center (GMSC) that manages the connection with other networks. For supporting packet switched services, the RNCs are connected to the serving general packet radio service (GPRS) support node (SGSN) and the gateway GPRS support node (GGSN) of the core network. The SGSN supports the packet communications with the RNCs and the GGSN manages the connection with other packet switched networks, such as the Internet.

FIG. 2 illustrates a structure of a radio interface protocol between the UE and the UTRAN according to the 3GPP radio access network standards. As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The user plane is a region that handles traffic information with the user, such as voice or Internet protocol (IP) packets. The control plane is a region that handles control information for an interface with a network, maintenance and management of a call, and the like. The protocol layers in FIG. 2 can be divided into a first layer (L1), a second layer (L2), and a third layer (L3) based on the three lower layers of an Open System Interconnection (OSI) standard model. The first layer (L1), namely, the physical layer, provides an information transfer service to an upper layer by using various radio transmission techniques. The physical layer is connected to an upper layer called a Medium Access Control (MAC) layer, via a transport channel.

The MAC layer and the physical layer exchange data via the transport channel. The second layer (L2) includes a MAC layer, a Radio Link Control (RLC) layer, a Broadcast/Multicast control (BMC) layer, and a Packet Data Convergence Protocol (PDCP) layer. The MAC layer handles mapping between logical channels and transport channels and provides allocation of the MAC parameters for allocation and re-allocation of radio resources. The MAC layer is connected to an upper layer called the Radio Link Control (RLC) layer, via a logical channel.

Various logical channels are provided according to the type of information transmitted. In general, a control channel is used to transmit information of the control plane and a traffic channel is used to transmit information of the user plane. A logical channel may be a common channel or a dedicated channel depending on whether the logical channel is shared. Logical channels include a Dedicated Traffic CHannel (DTCH), a Dedicated Control CHannel (DCCH), a Common Traffic CHannel (CTCH), a Common Control CHannel (CCCH), a Broadcast Control CHannel (BCCH), and a Paging Control CHannel (PCCH), or a Shared Control Channel (SCCH) and other channels. The BCCH provides information including information utilized by a UE to access a system. The PCCH is used by the UTRAN to access a UE.

For the purposes of MBMS (multimedia broadcast/multicast service; or other types of point-to-multipoint services), additional traffic and control channels are introduced in the MBMS standard. The MBMS point-to-multipoint Control Channel (MCCH) is used for transmission of MBMS control information, the MBMS point-to-multipoint Traffic Channel (MTCH) is used for transmitting MBMS service data. The MBMS Scheduling Channel (MSCH) is used to transmit scheduling information. The different logical channels that exist are listed below:

The MAC-d sub-layer manages a dedicated channel (DCH), which is a dedicated transport channel for a specific terminal. The MAC-d sublayer is located in a serving RNC (SRNC) that manages a corresponding user equipment, and one MAC-d sublayer also exists in each terminal. The RLC layer, depending of the RLC mode of operation supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as the IPv4 or IPv6, efficiently on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer controls the transport channels and the physical channels in relation to setup, reconfiguration, and

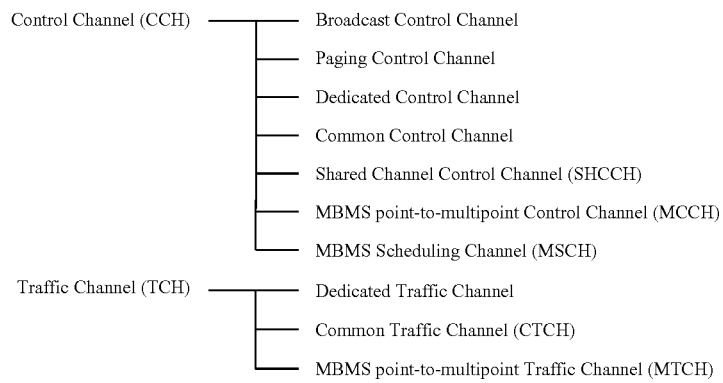

The MAC layer is connected to the physical layer by transport channels and can be divided into a MAC-b sub-layer, a MAC-d sub-layer, a MAC-c/sh sub-layer, a MAC-hs sub-layer and a MAC-m sublayer according to the type of transport channel being managed. The MAC-b sub-layer manages a BCH (Broadcast Channel), which is a transport channel handling the broadcasting of system information. The MAC-c/sh sub-layer manages a common transport channel, such as a forward access channel (FACH) or a downlink shared channel (DSCH), which is shared by a plurality of UEs, or in the uplink the Radio Access Channel (RACH). The MAC-m sublayer may handle the MBMS data.

The possible mapping between the logical channels and the transport channels from a UE perspective is given in FIG. 3.

The possible mapping between the logical channels and the transport channels from a UTRAN perspective is given in FIG. 4.

the release or cancellation of the radio bearers (RBs). The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods. Additionally the RRC handles user mobility within the RAN, and additional services, e.g. location services.

The different possibilities that exist for the mapping between the radio bearers and the transport channels for a given UE are not all possible all the time. The UE/UTRAN deduce the possible mapping depending on the UE state and the procedure that the UE/UTRAN is executing. The different states and modes are explained in more detail below, as far as they concern the present invention.

The different transport channels are mapped onto different physical channels. The configuration of the physical channels is given by RRC signalling exchanged between the RNC and the UE.

The DPCH channel can be established and used simultaneously between the UE and one or several cells of one or several NodeBs as shown in FIG. 5. This situation where the UE has a DPCH established simultaneously to several cells is called "soft handover". The case where the UE has established a DPCH simultaneously to several cells of the same NodeB is called "softer handover". For the DPCH the UE is always combining the TPC commands from all radio links in the downlink, and uses always the command which asks for the least transmit power (i.e. in the case one radio link says "up" and the other one "down" the UE chooses to decrease the transmit power).

The RLC layer (Radio Link Control) is a layer 2 protocol which is used in order to control the data exchange between the logical channels between the RNC and the UE. The RLC layer can currently be configured in 3 types of transfer modes:

Transparent mode,
Unacknowledged mode,
Acknowledged mode

The detailed behaviour of these modes is described in [3]. The different functionalities that are available depend on the transfer mode.

In acknowledged and unacknowledged mode, Serving Data Units (SDUs) can be split into smaller Packet Date Units (PDUs) that are used for transmission over the air interface. The transmitter side separates the SDU into PDUs, and based on control information that is added to the PDUs the receiver side re-assembles the PDUs in order to reconstruct the SDUs. Such control information is e.g. a PDU sequence number in order to detect whether a PDU has been lost, or a Length Indicator (LI) which indicates the beginning/end of a SDU inside an RLC PDU.

In unacknowledged mode the receiver does not send a confirmation to the transmitter of correctly received PDUs, but the receiver side just reassembles PDUs to SDUs based on signalling information contained in the PDUs and transfers the complete SDUs to higher layers.

In acknowledged mode the receiver sends acknowledgements for the correctly received PDU. The transmitter uses these acknowledgements in order to initiate retransmissions of missing PDUs. The acknowledgements are sent in certain conditions. There are several mechanisms foreseen in order to initiate the transmission of the acknowledgements for PDUs received by the receiver. Which mechanisms are activated is defined in the standard and/or configured by RRC signalling. One example for such a mechanism for the transmission of a status PDU is e.g. the reception of a PDU with a sequence number that does not correspond to the latest received sequence number increased by one, or when the receiver receives an indication from the transmitter in the RLC control information that an acknowledgment (also called "Status") should be sent. The indication of the transmitter to send a status PDU is called "Polling".

When the transmitter sends a Polling bit a mechanism is defined in the UMTS standard if no Status report has been received after the transmission of the polling after a certain time. This mechanism initiates the transmitter to retransmit a PDU including the polling indicator and is called "timer poll".

Another mechanism counts the number of retransmissions of a PDU. In the case the retransmission exceeds a certain number (MaxDat) the transmitter starts the reset procedure which is a procedure that allows to set the transmitter and the receiver entity of a radio bearer using AM RLC mode to an initial state. When the Reset procedure is initiated the initiating entity transmits a "Reset" PDU to the terminating entity. The terminating entity acknowledges the reception of the "Reset" PDU by transmitting the "Reset Ack" PDU. If the initiating entity has not received the "Reset Ack" PDU after a certain time the initiating entity retransmits the "Reset" PDU. If the initiating entity has not received an "Reset Ack" PDU after a certain amount of re-transmissions the initiating entity detects an "unrecoverable error".

This disclosure describes the situation where a dysfunction is detected in the operation of a radio Link Control (RLC) entity in RLC AM mode. Other mechanisms to detect a dysfunction are already described in the UMTS standard, or possible to be imagined and implemented. It is also possible to imagine detection mechanisms for RLC entities in UM mode, which would e.g. detect that undefined signalling information is included in the RLC PDU, or where higher layers detect that the reception/transmission of the UM entity is not behaving correctly.

As explained in the above, there are mechanisms defined in the standard that detect an "unrecoverable error", which can correspond to a blocked situation, or a situation where the communication is disturbed.

As explained in the above, there are mechanisms defined in the standard that detect an "unrecoverable error", which can correspond to a blocked situation, or a situation where the communication is disturbed.

If the UE detects an "unrecoverable error" situation as described in the standard, the UE enters CELL_FACH state and sends a "Cell update" message to the NodeB/RNC eventually indicating that an unrecoverable error has occurred by setting the IE (Information Element) "Cell update cause" to the cause "RLC unrecoverable error". The UE indicates by including the IE "AM_RLC error indication (RB2, RB3 or RB4)" that this unrecoverable error has either occurred for one of the Signalling Radio Bearers with the Identities 2, 3 or 4 or by including the IE "AM_RLC error indication (RB>4)" that this error has occurred for one of the Radio Bearers (RBs) using RLC AM mode with IDs higher than 4. The RNC can then send the "Cell Update Confirm" message and indicate that the RLC entities for SRBs with the IDs 2, 3 and 4, or for the RBs with Ids higher than 4 that use RLC AM mode shall be re-established by setting the IE "RLC re-establish indicator (RB2, RB3 and RB4)" and/or "RLC re-establish indicator (RB5 and upwards)" to "true".

The UM/AM RLC entity is also responsible for handling of ciphering and deciphering. In order to do so the RLC entity in the transmitter and the receiver maintain a COUNT-C number which is composed of a Hyper fFrame nNumber (HFN) and the RLC sequence number. The COUNT-C value, together with other information is used as input to a mathematical function that generates a bitstring. This bitstring and the RLC PDU except the SN are combined by the logical XOR operation, which ensures the ciphering of the data part of the RLC PDU. The HFN value is incremented each time the RLC SN wraps around (i.e. when the RLC SN reaches its highest value and restarts from 0). In the case the receiver misses a certain number of SNs, or in the case the received SN received has been altered during the reception it is possible that the COUNT-C in the receiver and the transmitter are desynchronized. In this case the receiver is not capable to decipher correctly the information received. The receiver can detect the dysfunction of the deciphering entity by different mechanisms which are not further described here, and which are not part of the invention.

HS-DSCH is a transport channel which allows to transmit data in the downlink in the UMTS standard, and which allows to use high data rates. The HS-DSCH channel is always mapped to the HS-PDSCH physical channel. The HS-PDSCH contrary to the DPCH can only be transmitted to a given UE from one cell at a time. The HS-DSCH channel uses a hybrid ARQ mechanism which allows fast retransmission of data from the NodeB to the UE. This mechanism is also described in [2]. In order to know whether the UE has received a given block correctly, the UE sends acknowledgments to the NodeB which are sent on the HS-DPCCH physical channel in the uplink as explained in [1]. In addition, on the HS-DPCCH the UE sends the CQI information which indicates the quality of the radio channel in downlink. This allows the NodeB to adapt the transport format and the scheduling on the channel conditions.

As illustrated in FIG. 5, during the transmission in CELL_DCH the UE performs inner loop power control i.e. the UE receives transmit power commands (TPC) from the NodeB which indicate to the UE whether it should increase the transmit power or decrease the transmit power on the DCH channels as described above. The UE combines the TPC received from the different cells. Normally this means that the UE adapts the transmit power to the best radio link in the UL. The UE increases or decreases the transmit power of the DPCCH, DPDCH and HS-DPCCH. The HS-DPCCH is only received by the cell that sends the HS-DSCH. This implies that the transmit power of the HS-DSCCH DPCCH is not always adapted to the uplink channel conditions between the UE and the HS-DSCH serving cell. This means that the HS-DSCH channel can be temporarily unavailable.

One of the main advantages is that the HS-DSCH is a shared channel, which implies that the necessary spreading codes do not need to be allocated in advance and can be shared dynamically amongst different users.

The RRC mode refers to whether there exists a logical connection between the RRC of the terminal and the RRC of the UTRAN. If there is a connection, the terminal is said to be in RRC connected mode. If there is no connection, the terminal is said to be in idle mode. Because an RRC connection exists for terminals in RRC connected mode, the UTRAN can determine the existence of a particular terminal within the unit of cells, for example which cell or set of cells the RRC connected mode terminal is in, and which physical channel the UE is listening to. Thus, the terminal can be effectively controlled.

In contrast, the UTRAN cannot determine the existence of a terminal in idle mode. The existence of idle mode terminals can only be determined by the core network to be within a region that is larger than a cell, for example a location or a routing area. Therefore, the existence of idle mode terminals is determined within large regions, and, in order to receive mobile communication services such as voice or data, the idle mode terminal must moves or changes into the RRC connected mode. The possible transitions between modes and states are shown in FIG. 6.

A UE in RRC connected mode can be in different states, e.g. CELL_FACH state, CELL_PCH state, CELL_DCH state or URA_PCH state. Other states could be envisaged of course. Depending on the states the UE carries out different actions and listens to different channels. For example a UE in CELL_DCH state will triesy to listen (amongst others) to DCH type of transport channels which comprises DTCH and DCCH transport channels and which can be mapped to a certain DPCH, DPDSCH, or other physical channels. The UE in CELL_FACH state willlistens to several FACH transport channels which are mapped to a certain S-CCPCH, the UE in PCH state will listens to the PICH channel and to the PCH channel which is mapped to a certain S-CCPCH physical channel.

As described above, a radio bearer carries data from layers above the L2, i.e. data generated inside the UTRAN, e.g. RRC and Non access stratum (NAS) signalling (more generally the c-plane) and user data (the u-plane). The data from the RRC signalling is today transported via 3 signalling radio bearers, which are numbered from 0 to 2. The data from NAS signalling is transmitted on the signalling radio bearer 3 and if used 4. The remaining radio bearer identifiers are available for transmitting user plane data.

For efficient transport of the different radio bearers according to their Quality of Service (QoS) characteristics, the radio bearers can be mapped via a logical channel on different transport channels. The possible mapping options for the radio bearers depend on the type of traffic they carry. The dedicated signalling radio bearers 0-4 are mapped via a DCCH/CCCH type of logical channels. The dedicated radio bearers that carry user plane traffic with identities above 5 are mapped via DTCH type of logical channels. The possible mapping options are defined via RRC signalling. Different mapping options can be defined independently for uplink and downlink and depending on the UE state, and the transport channels that are available.

As illustrated on FIG. 7, a possible configuration for mapping options in the downlink is shown. In this example four mapping options are configured:

In CELL_DCH state when HS-PDSCH and DPCH are available the SRB#1 to #4 are mapped on the DPCH, and the other Radio Bearers RB#5 to #20 are mapped to the HS-PDSCH. The SRB#0 is not mapped in this case.

In CELL_DCH state when DPCH is available and HS-PDSCH is not available the Signalling Radio Bearers SRB#1 to #4 and the other RB#5 to #20 are mapped to DPCH. The SRB#0 is not mapped in this case. In CELL_DCH state when DPCH is not available and HS-PDSCH is available the SRB#1 to #4 and the other RB#5 to #20 are mapped to HS-PDSCH. The SRB#0 is not mapped in this case.

In CELL_FACH state SRB#0 to #4 and the other RB#5 to #20 are mapped to FACH.

In the Release 6 of UTRAN a new physical channel type is introduced which is called "fractional DPCH" and which can be used in order to replace the normal DPCH channel. This channel type reduces the number of spreading codes that are needed in the downlink by sharing one code between different users. In order to reduce the code usage, no DCH transport channel can be carried by this "fractional DPCH" physical channel, although the SRBs are mapped on the HS-DSCH.

In the uplink the SRBs and the user plane radio bearers are mapped on the DPCH, or eventually on any other available channel. This allows that the UE can transmit in the uplink.

Here are two examples of situations where Radio Link Control (RLC) entity can be affected by an error which necessitates that a Radio Network Control (RNC) entity triggers a procedure for re-initializing the Radio Link Control (RLC) entity.

EXAMPLE 1

Degradation of the Quality of a Radio Link
(HS-DSCH RL Failure Case)

In the case the SRBs are mapped on the HS-DSCH there can be problems when the HS-DSCH becomes unavailable, but the UE is still RRC connected via the remaining radio links. The HS-DSCH channel relies on the uplink/downlink communication between the NodeB and the UE via different channels. These channels are in the downlink:
the HS-SCCH,
the HS-PDSCH.
In the uplink the reception of the HS-DSCH relies on:
the HS-DPCCH.

If the reception of one of these physical channels is not possible any more the transmission on the HS-DSCH is blocked. This could be the case e.g. due to bad radio conditions, due to the fact that the distance between the UE and the base station is too great, or that there is an obstacle or due to an inappropriate configuration of the channels. The UE is then blocked, and temporarily, no data can be sent to/from the UE.

The situation where the UE is blocked is shown on FIG. 8.

As shown in FIG. 8, the UE is connected to a first cell 1 of a first base station A and a second cell 2 of the second base station B. In the case that the radio conditions towards the cell 1, where the HS-DSCH channel is configured, becomes worse than the radio conditions towards the cell 2, it is necessary to change the configuration such that the HS-DSCH is configured to be sent from the cell 2 in order to avoid that the contact between the UE and the RNC is lost.

As shown on FIG. 9, according to a first step, the UE has radio links established with NodeB 1 and NodeB 2. The NodeB 1 is the NodeB that controls the HS-DSCH radio link.

According to a second step, the radio link towards the NodeB 1 degrades, for instance because the UE moves away from the NodeB 1 towards the NodeB 2.

According to a third step, the UE informs the RNC of the degradation in quality.

According to a fourth step, the RNC starts a reconfiguration procedure in order to move the HS-DSCH from the NodeB 1 to the NodeB 2.

In the case the radio quality degrades to a degree that the transmission on the HS-DSCH is not possible any more the situation where the reconfiguration as shown on FIG. 9, is not possible any more occurs. On the other hand the quality of the radio link towards the NodeB 2 could still be sufficiently good. In this case the UE is in a blocked situation, because the RNC can not send any information to the UE.

Currently the only mechanism that applies is that at some point in time there will be an "unrecoverable error" detected in either the UE or the RNC. In the case it is detected in the RNC, the RNC can delete the radio links that constitute the active set of the UE and provoke a radio link failure. In the case it is detected in the UE the UE will initiate a "Cell Update" procedure.

As shown on FIG. 10, according to a first step, the UE has radio links established with NodeB 1 and NodeB 2. The NodeB 1 is the NodeB that controls the HS-DSCH radio link.

According to a second step, the radio link towards the NodeB 1 degrades, for instance because the UE moves away from the NodeB 1 towards the NodeB 2.

According to a third step, the UE informs the RNC of the degradation in quality by transmitting a Measurement report. In the case the transmission on the HS-DSCH is already not possible any more the RNC will not be able to transmit the acknowledgment to the UE (3a). This will lead to an RLC unrecoverable error which will result in a Cell Update procedure, where the SRBs 2, 3 and 4 are re-established.

According to a fourth step, the RNC starts a reconfiguration procedure in order to move the HS-DSCH from the NodeB 1 to the NodeB 2. In the case that the downlink communication is not possible any more the message will be received from the RNC in the NodeB, but not be transmitted to the UE.

According to a fifth step, either the UE, the NodeB or the RNC triggers a mechanism such that the UE will enter CELL_FACH state.

According to a sixth step, the UE initiates the transmission of a Cell Update message.

This message contains two Information Elements (IEs) that are used in order to indicate the group of RBs that carry RLC entities that have experienced an unrecoverable error, either the RLC entities mapped to RBs with identity 2, 3 and 4 or the RLC entities mapped to Radio Bearers RBs with identity higher than 4. This message also carries the IE "START". This IE contains a value that is used in order to initialize the HFN value of the COUNT-C entity which is used for ciphering.

According to a seventh step, the RNC initiates the transmission of a Cell Update Confirm message. In this message it can set the IEs "RLC re-establish indicator (RB2, RB3 and RB4)" and/or "RLC re-establish indicator (RB5 and upwards)" to "true" in order to re-establish the RLC entities. However in the case the RLC entities 3 and 4 are re-established some messages from NAS layer might be lost.

According to an eighth step, upon reception of the message "Cell update Confirm" in the case the IEs "RLC re-establish indicator (RB2, RB3 and RB4)" and/or "RLC re-establish indicator (RB5 and upwards)" are set to "true" the UE re-initializes the RLC AM entities as indicated in the Cell Update Confirm message. The UE sets the most significant bits of the HFN of the COUNT-C s values for uplink and downlink to the START value. The remaining bits in the HFN are set to 0, and the SNs of the RLC entity is also initialized to 0.

According to a ninth step, the RNC re-initializes the RLC AM entities as indicated in the Cell Update Confirm message. The RNC sets the most significant bits of the HFN of the COUNT-C values for uplink and downlink to the START value. The remaining bits in the HFN are set to 0, and the SNs of the RLC entity is also initialized to 0.

According to a tenth step, the UE will send a confirmation message to the RNC.

If the RLC entity used for SRB2 has not been re-established the message transmitted at the fourth step is still in the retransmission buffer of the RNC. According to an eleventh step, this message will be received by the UE after the reception of the Cell Update confirm message. However at this point in time the content of this message is not adequate any more.

The UE could also apply a criteriaa criterion on the quality of the HS-DSCH channel, the available transmit power in the UE for uplink transmission or any other criteria in order to trigger the Cell Update.

In the case that the SRBs are mapped on the HS-DSCH transport channel, it is possible that the RNC has sent data to the UE in order to change the UE configuration. However in the case the downlink transmission is impossible the data will not reach the UE. Once the UE/RNC have resolved the problem, by performing a Cell Update procedure as described above the Reconfiguration message will be transmitted to the UE. However the content of the Reconfiguration message will not be applicable anymore, and it is likely that it will trigger a protocol error. A means to re-establish the RLC entity/ empty the re-transmission buffer of the RLC entity is therefore needed.

EXAMPLE 2

Detection of an Unrecoverable Error by the UE

In the case the UE detects an unrecoverable error in an RLC entity operating in AM mode the UE initiates a Cell Update Procedure.

As illustrated on FIG. 11, according to a first step, the UE detects an unrecoverable error in any AM RLC entity and transits to CELL_FACH state.

According to a second step, the UE then sends a "Cell Update" message to the RNC. As indicated above this message contains two IEs that are used in order to indicate the group of RBs that carry RLC entities that have experienced an unrecoverable error, either the RLC entities mapped to RBs with identity 2,3 and 4 or the R LC entities mapped to RBs with identity higher than 4. This message also carries the IE "START". This IE contains a value that is used in order to initialize the HFN value of the COUNT-C entity which is used for ciphering.

According to a third step, the RNC indicates the re-establishment of either all RLC entities which are mapped to the RBs with identities 2,3 and 4, or all RLC entities which are mapped to the RBs with identities higher than 4 by using the Cell Update Confirm message.

According to a fourth step, upon reception of the message "Cell update Confirm" the UE re-initializes the RLC AM entities as indicated in the Cell Update Confirm message. The UE sets the most significant bits of the HFN of the COUNT-C values for uplink and downlink to the START value. The remaining bits in the HFN are set to 0, and the SNs of the RLC entity is also initialized to 0.

According to a fifth step, the RNC re-initializes the RLC AM entities as indicated in the Cell Update Confirm message. The RNC sets the most significant bits of the HFN of the COUNT-C values for uplink and downlink to the START value. The remaining bits in the HFN are set to 0, and the SNs of the RLC entity is also initialized to 0.

According to a sixth step, the UE sends a message to confirm the re-establishment.

In the case the UE detects an unrecoverable error in a AM RLC entity, the UE can only indicate in which set of RLC entities there is an error.

In the case the UE detects an error in the decoding of an RLC UM bearer, the UE is currently not allowed to initiate any procedure to signal this error to the RNC.

Therefore, in the case the RNC has realized an unrecoverable error the RNC has no currently available means to initiate the re-establishment of the RLC entity affected by the error.

This is important because in the case that RLC entities of the RB Ids IDs 3 and/or 4 carrying information of the higher layer (NAS) are re-established in the downlink, data could be lost. Since there is no means for the RNC to verify whether the data has been received by the UE, and on the other hand the RNC is not allowed to duplicate the data the RNC can only release the signalling connection in this case.

DISCLOSURE OF INVENTION

Technical Problem

One aspect of the present invention involves the recognition by the present inventors of the drawbacks in the related art, as explained above. Based upon such recognition, improvements to radio link control error handling procedures can be achieved according to the present invention.

It is a desired result of the present invention to minimize lost loss of data when settling errors in a radio link control entity.

According to the method of the invention, a radio link control entity which is affected by an error is exactly identified and therefore a procedure for resolving the error can be initiated only in the radio link control entity identified.

The method of the invention allows to apply the procedure for resolving the error to specific RLC entities, and not on a group of radio link control entities without distinguishing between entities that are in error and entities that operate correctly, as in the related art.

BRIEF DESCRIPTION OF THE DRAWINGS

The invention will be described with reference to the drawings, in which:

FIG. 1 schematically represents a general UMTS network architecture,

FIG. 2 schematically represents a structure of a radio interface protocol between a user equipment and a UTRAN according to the 3GPP radio access network standards, FIG. 3 schematically illustrates the possible mappings between logical channels and transport channels, as seen from the UE side, FIG. 4 schematically illustrates the possible mappings between logical channels and transport channel, as seen from the UTRAN side, FIG. 5 schematically illustrates a user equipment connected to a cell through a HS-DSCH in an AM mode, FIG. 6 schematically illustrates possible transition states of the user equipment in a UMTS network, FIG. 7 schematically illustrates mapping configurations between radio bearers and transport channels for the downlink, depending on the user equipment state, FIG. 8 schematically illustrates a user equipment in a blocked situation due to degradation of the quality of the radio link, FIG. 9 schematically illustrates a reconfiguration procedure for performing a change of serving HS-DSCH cell due to degradation of the quality of the radio link, according to the related art, FIG. 10 schematically illustrates a recovery procedure after failure to change a serving HS-DSCH cell, according to the related art, FIG. 11 schematically illustrates a recovery procedure after detection of an unrecoverable error, according to the related art, FIG. 12 schematically illustrates a method for settling an error in a radio link control entity according to a first embodiment of the invention, FIG. 13 schematically illustrates a method for settling an error in a radio link control entity according to a second embodiment of the invention.

MODE FOR THE INVENTION

The present invention is described as being implemented in a 3GPP type mobile communications system. However, the features of the present invention may also be adapted and implemented in communications systems operating under other types of communication specifications (e.g., 3GPP2, 4G, IEEE, OMA, etc.), because the concepts and teachings of the present invention could be applied to various communication schemes that operate in a similar manner based upon common techniques.

One aspect of the invention is that the UE reports detailed information about the situation of errors/dysfunctions in RLC entities. This additional information could contain:

(1) the RB id of the radio bearer that carries data of the RLC entity (2) any other identifier of the RLC entity (3) the type of error, e.g.

reception of undefined control information detection of errors by higher layer protocols, e.g. PDCP/IP etc. which indicate an error of the RLC operation situations defined in the RLC protocol as unrecoverable error situations detected by any other means in the UE implementation that indicates an error detection of a dysfunction in the deciphering Uplink or Uplink/Downlink or Downlink only affected Another aspect of the invention is a UE that initiates the transmission of the above additional information at the moment when any of the errors listed above are detected. The transmission of the message in the uplink can be done on the current configuration, or include also a state transition. Especially the error detected in a UM entity can be a trigger for the transmission of the message, where the procedure to detect the error could be implementation specific.

A further aspect of the invention concerns a UTRAN that re-initializes/re-establishes an RLC entity. One possibility is that the RNC sends an indication to re-establish the RLC entity in the UE in a message sent to the UE or that the RNC sends a new message which indicates that the RLC entity needs to be re-established to the UE. Additional information is needed to indicate the RLC entity, or the RB id of the radio bearer that carries data of the RLC entity that shall be re-initialized/re-established, the direction of the transmission etc.

Exemplary embodiments of the present invention will be described hereafter.

FIG. 12 schematically illustrates a method for settling an error in a radio link control entity according to a first embodiment of the invention, in case the quality of the radio link between the UE and the network degrades (HS-DSCH RL failure case).

According to a first step, the UE has radio links established with NodeB 1 and NodeB 2. The NodeB 1 is the NodeB that controls the HS-DSCH radio link.

According to a second step, the radio link towards the NodeB 1 degrades, for instance because the UE moves away from the NodeB 1 towards the NodeB 2.

According to a third step, the UE informs the RNC of the degradation in quality by transmitting a Measurement report. In the case the transmission on the HS-DSCH is already not possible any more the RNC will not be able to transmit the acknowledgment to the UE (3a). This will lead to an RLC unrecoverable error which will result in a Cell Update procedure.

According to a fourth step, the RNC starts a reconfiguration procedure in order to move the HS-DSCH from the NodeB 1 to the NodeB 2. In the case that the downlink communication is not possible any more the message will be received from the RNC in the NodeB, but not be transmitted up to the UE.

According to a fifth step, either the UE, the NodeB or the RNC triggers a mechanism such that the UE will enter CELL_FACH state.

According to a sixth step, the UE initiates the transmission of a Cell Update message or URA update message to the RNC.

In the UMTS system the Cell Update message or UMTS Routing Area (URA) update message is normally used in order to indicate an unrecoverable error in the uplink to the RNC. This message is sent on the CCCH from the UE to the RNC. It is current practice to add "non-critical extensions" to the message sent by the UE in the uplink to newer releases of the protocol specification. These extensions are coded in a way that an RNC that does not understand the extension can still decode the part of the message that the RNC understands.

According to a first possibility, the Cell Update message or URA update message includes data identifying a radio bearer associated to the radio link control entity which is affected by the error.

For instance, the Cell update or URA update message includes an extension which contains a list of RB identities and/or identities of RLC entities for which an error according to the above has occurred.

According to a second possibility, the Cell Update or URA update message includes a binary variable. The binary variable designates a particular radio bearer, the radio bearer being associated with the radio link control entity which is affected by the error. The binary variable thus identifies the radio link control entity.

For instance, the Cell update or URA update message includes an extension which contains at least one IE (true/false) and/or cause value which indicates that a RB and/or RLC entity for which the identity or the identity of the RB that carries data of this entity (e.g. the SRB 2) is specified in the standard and/or the transmission direction of that RLC entity affected to the "Cell update" or "URA Update" message.

In an alternative, the Cell update or URA update message includes an extension which contains the information that all or a subset of all RLC entities using UM mode have experienced an error, and/or the error cause/and or the direction (uplink, uplink/downlink, downlink) to the "Cell update" or "URA Update" message. Especially the subset could be all RLC entities using RLC UM mode except the RLC entities mapped on the SRB 0 and 1.

The Cell Update message or URA Update message also includes a START value. The START value is an initialization value allowing to re-synchronize the counter in the radio link control entity of the user equipment and the counter in a radio link control entity of the cellular network.

The Cell Update message or URA update message can also include data indicative of a cause of the error.

In this case, the Cell update message or URA update message includes an extension which contains an IE that indicates the cause of the error.

The Cell Update message or URA update message can also include data indicative of a transmission direction of a radio bearer associated to the radio link control entity which is affected by the error.

In this case, the Cell update or URA update message includes an extension which contains an IE that indicates the transmission direction of the RLC entity affected by the error.

The already available mechanism for indication of unrecoverable error in the "Cell update" or "URA update" message needs to be maintained in order to ensure that a UE that sends this message to an RNC that does not understand the extension containing the list. Here, it should be noted that the RB can use the legacy mechanism to indicate RLC unrecoverable errors.

The UE can also indicate RLC entities where an error has occurred and eventually provide additional information. In the case the RNC would not have implemented this method it would just ignore the information.

The transmission of the message from the UE to the RNC is triggered in the case the UE has detected any error situation or dysfunction (e.g., ciphering problems) in an RLC entity in the uplink and/or downlink. The message containing the information according to the above would be transmitted according to the currently available specification rather on the CCCH logical channel mapped on the RACH transport channel which is normally mapped on the PRACH physical channel. However it is possible to transmit this information also on any other logical, transport or physical channel, and the mapping does not restrict at all the invention. In order to be able to transmit a message on the PRACH channel it might be necessary that the UE initiates a state transition, i.e. the UE would move to the CELL_FACH state, while stopping the reception/transmission on the channels that are used in the CELL_DCH state. Especially the detection of an error (undefined control information, gap bigger than the SN space, problem of deciphering) in an RLC UM entity would be a new trigger for the state transition to CELL_FACH and the transmission of the message containing the information as described above.

Any extension according to the above alternatives could also be sent on any other RB/transport channel/physical channel and could be added to any other message in the uplink. When the UE detects that one or more RLC entities are not working correctly any more and the UE indicates this in other messages to the RNC, the UE would also include a START value in order to allow the RNC and the UE to re-initialize the MSB of the HFN of the COUNT-C values with the same value.

According to a seventh step, the RNC initiates the transmission of a message. In the case the RNC has implemented the method, the message indicates the RLC entity that has to be re-established. The RNC can indicate RLC entities to be re-established independently of whether they were indicated in the Cell Update or URA update message sent by the UE.

The message sent by the RNC to the UE can be a Cell Update confirm message, a URA Update Confirm message, a UTRAN mobility information message, a Radio Bearer Reconfiguration message, a Radio Bearer Setup message, a Radio Bearer Release message, a Transport Channel Reconfiguration message or a Physical Channel Reconfiguration message.

Other messages could be sent, and new messages could be created in order to carry the information on the re-establishment.

The message sent by the RNC includes data identifying the radio link control entity which must be re-established.

According to a first possibility, the RNC sends a Cell Update Confirm message including data identifying a radio bearer associated to the radio link control entity.

For instance, the Cell update or URA update message includes an extension which contains a list of RB identities and/or identities of RLC entities for which an error according to the above has occurred.

According to a second possibility, the RNC sends a Cell Update Confirm message including a binary variable. The binary variable designates a particular radio bearer, the radio bearer being associated with the radio link control entity which is affected by the error. The binary variable thus identifies the radio link control entity.

For instance, the Cell Update Confirm message includes an extension which contains at least one IE (true/false) and/or cause value which indicates that a RB and/or RLC entity for which the identity or the identity of the RB that carries data of this entity (e.g. the SRB 2) is specified in the standard and/or the transmission direction of that RLC entity affected to the Cell update Confirm message.

In an alternative, the Cell Update Confirm message includes an extension which contains the information that all or a subset of all RLC entities using UM mode have experienced an error, and/or the error cause/and or the direction (uplink, uplink/downlink, downlink) to the "Cell update" or "URA update" message. Especially the subset could be all RLC entities using RLC UM mode except the RLC entities mapped on the SRB 0 and 1.

According to an eighth step, upon reception of the Cell update Confirm message, the user equipment re-initializes the radio link control entity according to the data included in the message.

The UE sets the most significant bits of the HFN of the COUNT-Cs value for uplink and downlink to the START value. The remaining bits in the HFN are set to 0, and the SNs of the RLC entity is also initialized to 0.

According to a ninth step, the RNC re-initializes the RLC AM entities as indicated in the Cell Update Confirm message. The RNC sets the most significant bits of the HFN of the COUNT-C values for uplink and downlink to the START value. The remaining bits in the HFN are set to 0, and the SNs of the RLC entity are also initialized to 0.

When the RNC sends a message including the information about the establishment of an RLC AM/UM entity in the uplink, downlink or uplink and downlink, the RNC re-establishes the corresponding part of the RLC entities by resetting the corresponding state variables as described in the RLC specification of 3GPP and/or initializing the MSB of the HFN of the direction of the corresponding RLC entity with a "START" value which has been synchronised between the UE and the RNC before, e.g. when the "START" value has been transmitted from the UE to the RNC in the "Cell update" message. Upon reception of the message, the UE re-establishes the corresponding part of the RLC entities by resetting the corresponding state variables as described in the RLC specification of 3GPP and/or initializing the MSB of the HFN of the direction of the corresponding RLC entity with a "START" value which has been synchronised between the UE and the RNC before, e.g. when the "START" value has been transmitted from the UE to the RNC in the "Cell update" message.

According to a tenth step, the UE sends a confirmation message to the RNC.

FIG. 13 illustrates a method for settling an error in a radio link control entity according to a second embodiment of the invention, in case a user equipment (UE) detects an unrecoverable error in the operation of the radio link control entity.

According to a first step, the UE detects an unrecoverable error in any AM RLC entity and transits to CELL_FACH state.

According to a second step, the UE sends a Cell Update message to the RNC, the message indicating an unrecoverable error.

The Cell Update Message includes data identifying the radio link control entity which is in error.

According to a first possibility, the Cell Update message includes a binary variable. The binary variable designates a particular radio bearer, the radio bearer being associated with the radio link control entity which is affected by the error. The binary variable thus identifies the radio link control entity.

According to a second possibility, the Cell Update message includes data identifying a radio bearer associated to the radio link control entity.

The Cell Update message also includes a START value. The START value is an initialization value allowing to re-synchronize the counter in the radio link control entity of the user equipment and the counter in a radio link control entity of the cellular network.

The Cell Update message can also include data indicative of a cause of the error and data indicative of a transmission direction of a radio bearer associated to the radio link control entity which is affected by the error.

The UE can also indicate RLC entities where an error has occurred and eventually, additional information.

In the case the RNC would not have implemented this method it would just ignore the information.

According to a third step, the RNC initiates a transmission of a Cell Update Confirm message. In the case the RNC has implemented the method, the RNC indicates the RLC entity that it wants to be re-established. The RNC can indicate RLC entities to be re-established independently of whether they are indicated in the Cell Update message.

The Cell Update Confirm message includes data identifying the radio link control entity which is in error.

According to a first possibility, the Cell Update Confirm message includes a binary variable. The binary variable designates a particular radio bearer, the radio bearer being associated with the radio link control entity which is affected by the error. The binary variable thus identifies the radio link control entity.

According to a second possibility, the Cell Update Confirm message includes data identifying a radio bearer associated to the radio link control entity.

According to a fourth step, upon reception of the Cell update Confirm message, the UE re-initializes the deficient RLC AM entities according to the data included in the Cell Update Confirm message.

The UE upon reception of this message re-establishes the RLC entity. The UE eventually re-initializes the RLC entity in only one direction. The UE eventually uses the START value transmitted in the Cell Update message in order to initialize the MSB of the HFN of the COUNT-C of the direction that is ordered to be re-established in the Cell Update Confirm message.

During this recovery procedure, parts of messages that have been received before are removed from the RNC buffer, so that they will not be received and/or re-transmission will be not requested by the UE after the recovery procedure. Especially in the case the RNC indicates to re-establish RLC entity 2 this will allow the RNC to remove the message sent in the fourth step.

According to a fifth step, the RNC re-initializes the RLC AM entities as indicated in the Cell Update Confirm message.

The RNC eventually re-initializes the RLC entity in only one direction. The RNC eventually uses the START value transmitted in the Cell Update message in order to initialize the MSB of the HFN of the COUNT-C of the direction that is ordered to be re-established in the Cell Update Confirm message.

During this recovery procedure, parts of messages that have been received before are removed from the RNC buffer, so that they will not be received and/or re-transmission will not be requested by the UE after the recovery procedure.

According to a sixth step, the UE sends a message in order to acknowledge the reception of the Cell Update Confirm message and to confirm the re-establishment.

In the above description of FIGS. 12 and 13 the exchange of messages between the RNC and the UE is described. However, the role of the RNC can be taken by any other entity, within the scope of the present invention.

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

The present invention provides a method of performing a cell update procedure, comprising: detecting an error associated with a radio link established with a base station; informing the base station about at least one radio bearer, at least one radio link control entity, or both having the detected error; and re-configuring the at least one radio bearer, re-establishing the at least one radio link control entity, or both based upon the informing step.

The steps may be performed for acknowledged mode operation or for unacknowledged mode operation. The error may indicate reception of undefined control information. The error may indicate detection of errors by higher layer protocols which indicate an error of the RLC operation. The error may indicate situations defined in the radio link control protocol as unrecoverable error. The error may indicate situations detected by any other means in mobile station implementation that indicates an error. The error may indicate detection of a dysfunction in the deciphering. The error may indicate whether the uplink or uplink/downlink or downlink is affected. If the re-configuring is performed, a re-transmission buffer is flushed. The informing may be performed by using cell update messages or URA update messages. The cell update messages or URA update messages may include extensions, indicating that all or a subset of all radio link control entities have experienced an error and/or a cause of the error and/or a transmission direction of the radio link control entity affected by the error. A legacy mechanism may be additionally used to indicate radio link control unrecoverable errors.

Also, the present invention provides a method of performing a cell update procedure, comprising: discovering, by the mobile station, an error associated with a radio link established with a base station; reporting, by a mobile station to a base station, information about errors and/or dysfunctions in radio link control entities and/or errors in at least one radio bearer as a result of the discovering step; and updating, by the mobile station and/or the base station, at least one radio link control entity and/or at least one radio bearer based upon the reporting step.

The updating step may comprise: re-establishing at least one radio link control entity, re-configuring at least one radio bearer, or performing both the re-establishing and re-configuring steps. The information may comprise at least one of a radio bearer identification of a radio bearer that carries data of a corresponding radio link control entity, other identifiers of the radio link control entity that has the errors and/or dysfunctions, and a type of error. The steps are performed for acknowledged mode operation or unacknowledged mode operation.

As described thus far, those skilled in the art related to the field of the present invention would understand that various substitutions, modifications, and changes are possible within the technical scope of the present invention, without being limited to the exemplary embodiments and attached Figures described herein.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

ABBREVIATIONS

AM Acknowledged mode
AS Access Stratum
ASN.1 Abstract Syntax Notation.1
CCCH Common Control CHannel
CQI Channel Quality Indicator
HS-DSCH High Speed Physical Downlink Shared CHannel
MAC Medium Access Control
MBMS Multicast Broadcast Multimedia Service
NAS Non Access Stratum
RLC Radio Link Controller
RNC Radio Network Controller
RRC Radio Resource Control
S-CCPCH Secondary Common Control Physical CHannel
SRB Signalling Radio Bearer
TCTF Target Channel Type Field
TFC Transport format combinationTM Transparent mode-
TPC Transmit power commands
UE User Equipment
UM Unacknowledged mode

SEQUENCE LISTING

[1] 3GPP TS 25.211: "Physical channels and mapping of transport channels onto physical channels (FDD)"
(ftp://ftp.3gpp.org/Specs/2004-09/Rel-6/25 series/25211-620.zip)
[2] 3GPP TS 25.308:"High Speed Downlink Packet Access (HSDPA)"
(ftp://ftp.3gpp.org/Specs/2004-09/Rel-6/25 series/25308-620.zip)
[3] 3GPP TS 25.322: "Radio Link Control (RLC) protocol specification"
(ftp://ftp.3gpp.org/Specs/2004-09/Rel-6/25 series/25322-610.zip)
[4] 3GPP TS 25.331: "Radio Resource Control (RRC)"
(ftp://ftp.3gpp.org/Specs/2004-12/Rel-6/25 series/25331-640.zip)

The invention claimed is:

1. A method of performing a cell update procedure at a mobile station, the method comprising:
    detecting an error associated with a radio link established with a base station;
    transmitting a message related to an update of the radio link, from the mobile station to the base station, to inform the base station about the detected error, wherein the message comprises first identifier data to identify a particular radio bearer associated with a particular radio link control entity affected by the error and second identifier data to identify the particular radio link control entity affected by the error; and
    re-establishing the identified radio bearer to the base station when the base station indicates that the identified radio bearer needs to be re-established and re-establishing the identified radio link control entity to the base station when the base station indicates that the identified radio link control entity needs to be re-established,
    wherein the second identifier data transmitted from the mobile station to the base station is used to identify a first counter in a first radio link control entity of the base station and a second counter in a second radio link control entity of the mobile station for synchronizing the first and second radio link control entities with a same initialization value,
    wherein the transmitted message is either a cell update message or a universal mobile telecommunication system (UMTS) routing area (URA) update message,
    wherein the cell update message and the URA update message each include a non-critical extension using a specific code such that a particular base station that does not understand the non-critical extension can still decode at least a portion of the transmitted message that the particular base station understands,
    wherein the non-critical extension of the transmitted message from the mobile station to the base station includes first indicators that indicate at least a subset of all radio link control entities that experienced a first particular error, a cause of the first particular error, and a transmission direction of the at least a subset of all radio link control entities affected by the first particular error,
    wherein the transmitted message indicates radio link control unrecoverable errors using a legacy mechanism when the base station does not understand the non-critical extension,
    wherein the identified radio bearer is re-established upon receiving the cell update confirm message or the URA update confirm message from the base station,
    wherein the cell update confirm message and the URA update confirm message each include a particular extension containing a list of radio bearer identities or identities of radio link control entities, and
    wherein the particular extension further includes second indicators that indicate at least a subset of all radio link control entities that experienced a second particular error, a cause of the second particular error, and a transmission direction of the at least a subset of all radio link control entities affected by the second particular error.

2. The method of claim 1, wherein the cell update procedure is performed in an acknowledged mode operation.

3. The method of claim 1, wherein the cell update procedure is performed in an unacknowledged mode operation.

4. The method of claim 1, wherein the detected error indicates reception of undefined control information.

5. The method of claim 1, wherein the detected error indicates detection of errors by higher layer protocols related to an RLC operation error.

6. The method of claim 1, wherein the detected error indicates situations defined in a radio link control protocol as an unrecoverable error.

7. The method of claim 1, wherein the detected error indicates error situations detected in mobile station implementation.

8. The method of claim 1, wherein the detected error indicates detection of a dysfunction when deciphering information.

9. The method of claim 1, wherein the detected error indicates whether an uplink, an uplink/downlink or a downlink is affected.

10. The method of claim 1, wherein re-establishing the identified radio bearer comprises flushing a re-transmission buffer.

* * * * *